US010982601B2

(12) United States Patent
Anders et al.

(10) Patent No.: US 10,982,601 B2
(45) Date of Patent: Apr. 20, 2021

(54) COMBUSTION CONTROL SYSTEM AND METHOD FOR SWITCHING BETWEEN SPARK AND PILOT-IGNITED OPERATING MODES IN DUAL FUEL ENGINE

(71) Applicant: Caterpillar Inc., Deerfield, IL (US)

(72) Inventors: Jonathan W. Anders, Peoria, IL (US); Bobby John, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/355,210

(22) Filed: Mar. 15, 2019

(65) Prior Publication Data

US 2020/0291875 A1    Sep. 17, 2020

(51) Int. Cl.

| | | |
|---|---|---|
| *F02D 19/00* | (2006.01) | |
| *F02D 19/06* | (2006.01) | |
| *F02M 37/00* | (2006.01) | |
| *F02B 43/12* | (2006.01) | |
| *F02M 21/02* | (2006.01) | |

(52) U.S. Cl.
CPC .......... *F02D 19/0642* (2013.01); *F02B 43/12* (2013.01); *F02D 19/0607* (2013.01); *F02M 21/029* (2013.01); *F02M 37/0064* (2013.01); *F02B 2201/064* (2013.01)

(58) Field of Classification Search
CPC .... F02D 19/061; F02D 41/0027; F02D 19/10; F02D 19/024; F02D 19/0647; F02D 41/403; F02D 19/105; F02D 41/0025; Y02T 10/36; Y02T 10/32; Y02T 10/44; Y02T 10/123; F23Q 9/00; F02B 2201/06; F02M 21/0215; F02M 43/00; F02P 19/026

USPC ..... 123/27 GR, 525, 636, 638; 701/101–104
See application file for complete search history.

(56) References Cited

U.S. PATENT DOCUMENTS

| | | | |
|---|---|---|---|
| 4,576,137 A * | 3/1986 | Tanaka ................. | F02D 19/105 123/276 |
| 6,276,334 B1 | 8/2001 | Flynn et al. | |
| 6,467,452 B1 * | 10/2002 | Duffy .................... | F02D 41/402 123/299 |
| 6,505,601 B1 | 1/2003 | Jorach et al. | |
| 6,561,157 B2 | 5/2003 | Zur Loye et al. | |
| 6,907,870 B2 | 6/2005 | Zur Loye et al. | |
| 6,915,776 B2 | 7/2005 | zur Loye et al. | |
| 7,007,669 B1 | 3/2006 | Willi et al. | |

(Continued)

FOREIGN PATENT DOCUMENTS

KR    20100006893 U    7/2010

*Primary Examiner* — George C Jin
*Assistant Examiner* — Teuta B Holbrook
(74) *Attorney, Agent, or Firm* — Brannon Sowers & Cracraft (57) ABSTRACT

A method of controlling a dual fuel engine system includes adjusting a phasing control parameter such as air-fuel ratio (AFR), based on a phasing signal to limit an error in a phasing of combustion of gaseous fuel. The cylinder is switched to a dual fuel liquid pilot-ignited mode by commanding direct injection of an early pilot shot of liquid fuel, based on the adjustment to the phasing control parameter, and production of a spark to ignite gaseous fuel in the cylinder. Switching the cylinder to the dual fuel liquid pilot-ignited mode is completed by commanding direct injection of an early pilot shot and a second pilot shot of liquid fuel to ignite gaseous fuel in response to combustion of the early and second pilot shots in the cylinder.

20 Claims, 2 Drawing Sheets

(56) References Cited

U.S. PATENT DOCUMENTS

| | | |
|---|---|---|
| 7,841,308 B1 | 11/2010 | Muth |
| 8,925,518 B1 | 1/2015 | Riley et al. |
| 9,856,835 B1 | 1/2018 | Coldren et al. |
| 9,890,689 B2 | 2/2018 | Hampson et al. |
| 10,273,894 B2 | 4/2019 | Tripathi |
| 2004/0065293 A1* | 4/2004 | Goto .................... F02B 19/108 |
| | | 123/275 |
| 2009/0012698 A1* | 1/2009 | Shinagawa ......... F02D 13/0215 |
| | | 701/103 |
| 2013/0146037 A1 | 6/2013 | Han et al. |
| 2014/0331970 A1* | 11/2014 | Bidner ................ F02D 19/0642 |
| | | 123/435 |
| 2015/0240738 A1* | 8/2015 | Yerace ................ F02D 19/0692 |
| | | 123/27 GE |
| 2016/0017824 A1* | 1/2016 | Touchette ........... F02D 41/0027 |
| | | 123/481 |
| 2016/0230712 A1* | 8/2016 | Akinyemi ........... F02D 41/0065 |
| 2016/0258400 A1* | 9/2016 | Sjoholm ............ F02M 21/0212 |
| 2017/0101940 A1* | 4/2017 | Sugishita ............ F02D 41/0002 |
| 2017/0241325 A1 | 8/2017 | Gu et al. |
| 2017/0298843 A1* | 10/2017 | Sjoholm ............. F02D 19/0694 |
| 2018/0100450 A1* | 4/2018 | Sauve .................... F02M 43/04 |
| 2018/0298840 A1* | 10/2018 | Hagiwara ................ F02D 19/10 |
| 2019/0338714 A1* | 11/2019 | Sixel .................... F02D 35/023 |

\* cited by examiner

COMBUSTION CONTROL SYSTEM AND METHOD FOR SWITCHING BETWEEN SPARK AND PILOT-IGNITED OPERATING MODES IN DUAL FUEL ENGINE

TECHNICAL FIELD

The present disclosure relates generally to controlling a dual fuel engine system, and more particularly to switching a cylinder in the dual fuel engine system from a gaseous fuel spark-ignited mode to a dual fuel liquid pilot-ignited mode.

BACKGROUND

Internal combustion engines are used in virtually innumerable applications throughout the world for vehicle propulsion, electric power generation, handling of liquids and gases, and for various industrial purposes. In a typical operating scheme, fuel and air is combusted within an engine cylinder to produce a rapid rise in pressure and thus drive a piston to rotate a crankshaft. Spark-ignited engines typically employ a liquid petroleum distillate fuel such as gasoline, or various gaseous fuels including natural gas, methane, propane, various mixtures of these, and still others. Compression-ignition engines conventionally utilize fuels such as diesel distillate fuel, biodiesel, and still others. Combustion science research in recent years has paid great attention to engine systems and operating strategies that are flexible with regard to fuel utilization, notably gaseous fuels. Fuel prices can be fairly dynamic, and flexibility with regard to a type of fuel used in an engine can provide economic advantages. Various gaseous fuels also have desirable combustion or emissions properties which can be advantageously exploited.

Engines that allow for operation with different fuel types combining both a liquid fuel such as diesel distillate and natural gas are in increasing use throughout the world. Diesel and similar fuels are relatively easy to compression ignite, but can produce undesirable emissions. Natural gas and other gaseous fuels, when used in a compression-ignition engine, can fail to ignite, knock, or have problems with combustion stability. Such challenges can be especially acute in so-called lean burn applications where gaseous fuel and air are burned or attempted to be burned at a stoichiometrically lean equivalence ratio. Gaseous fuels can also have a range of quality depending upon the nature of the constituents. Gaseous fuels that have relatively high proportions of methane tend to compression ignite relatively less easily than other fuels containing longer chain hydrocarbons. Consequently, different fuels and fuel blends can have varying ignition and combustion properties.

Dual fuel engines are known which utilize an early shot of injected liquid fuel in relatively small quantities that is vaporized to produce a premixed charge of fuel and air to ignite a larger main charge of gaseous fuel. Such engines can address some of the foregoing problems. Controlling combustion timing or other parameters using a premixed charge that is relatively homogenous throughout the cylinder continues to provide challenges, however. In certain of these engines multiple different operating modes are possible, ranging from liquid-only compression ignition modes, where the engine operates solely on fuel that is injected in a liquid form, to gaseous fuel-only spark-ignition modes where only a gaseous fuel is used, with factors such as engine speed and load monitored for transitioning amongst the modes. Numerous obstacles remain respecting combustion control and other operating targets in engines having more than one mode of available operation. One example dual fuel engine employing a diesel pilot injection to ignite natural gas is known from U.S. Pat. No. 6,032,617 to Willi, et al.

SUMMARY OF THE INVENTION

In one aspect, a method of controlling a dual fuel engine system includes producing a phasing signal indicative of a phasing of combustion of gaseous fuel in a cylinder in the dual fuel engine system operated in a gaseous fuel spark-ignited mode, and adjusting a phasing control parameter, based on the phasing signal, to limit an error in a phasing of combustion of gaseous fuel in the cylinder in the gaseous fuel spark-ignited mode. The method fiffther includes initiating switching the cylinder to a dual fuel liquid pilot-ignited mode at least in part by commanding direct injection of an early pilot shot of liquid fuel, based on the adjustment to the phasing control parameter, and production of a spark to ignite gaseous fuel in the cylinder. The method still further includes completing switching the cylinder to the dual fuel liquid pilot-ignited mode at least in part by commanding direct injection of an early pilot shot and a second pilot shot of liquid fuel to ignite gaseous fuel in the cylinder.

In another aspect, a combustion control system for a dual fuel engine system includes a combustion sensor structured to produce a phasing signal indicative of a phasing of combustion of gaseous fuel in a cylinder in the dual fuel engine system operated in a gaseous fuel spark-ignited mode. The combustion control system further includes a combustion control unit coupled to the combustion sensor and structured to adjust a phasing control parameter, based on the phasing signal. The combustion control unit is further structured to switch the cylinder from operating in the gaseous fuel spark-ignited mode to operating in a dual fuel liquid pilot-ignited mode based on the adjustment to the phasing control parameter at least in part by: commanding direct injection of an early pilot shot of liquid fuel into the cylinder and production of a spark to ignite gaseous fuel in the cylinder in a first engine cycle, and commanding direct injection of an early pilot shot and a second pilot shot of liquid fitel into the cylinder to ignite gaseous fuel in the cylinder in a second engine cycle occurring after the first engine cycle.

In still another aspect, a method of operating a dual fuel engine system includes operating a cylinder in the dual fuel engine system in a gaseous fuel spark-ignited mode to ignite gaseous fuel in the cylinder in response to production of a spark, and operating the cylinder in the dual fuel engine system in a dual fuel liquid pilot-ignited mode to ignite gaseous filet in the cylinder in response to combustion of an early pilot shot and a second pilot shot of directly injected liquid fuel. The method further includes limiting an error in a phasing of combustion in the cylinder in the gaseous fuel spark-ignited mode by adjusting a phasing control parameter, and triggering switching the cylinder from the gaseous fuel spark-ignited mode to the dual fuel liquid pilot-ignited mode based on the adjustment to the phasing control parameter. The method still further includes igniting gaseous fuel in the cylinder in response to combustion of a directly injected early pilot shot of liquid fuel and production of a spark during the switching of the cylinder from the gaseous fuel spark-ignited mode to the dual fuel liquid pilot-ignited mode.

DETAILED DESCRIPTION

Figure 1:
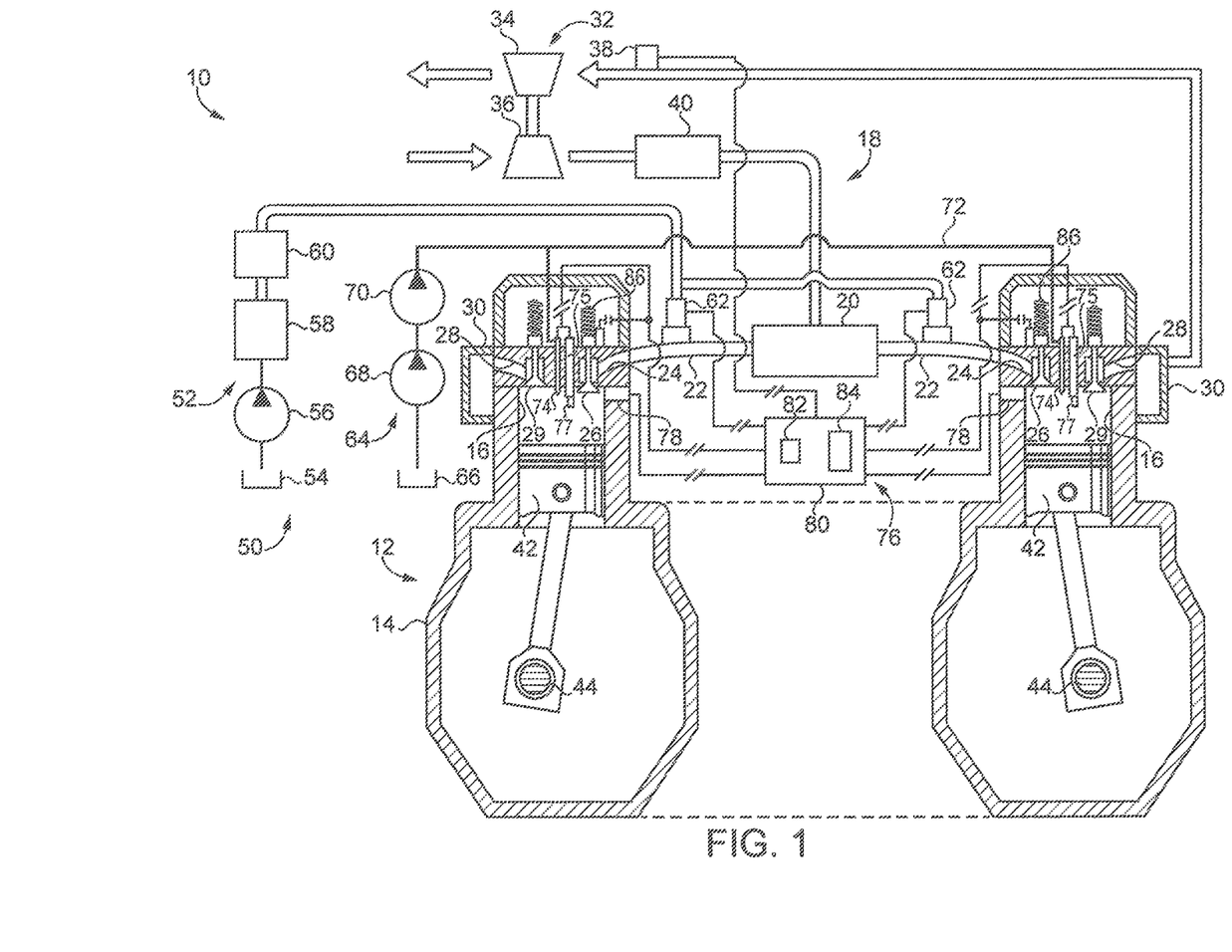
FIG. 1 is a diagrammatic view of a dual el engine system, according to one embodiment.

Referring to FIG. 1, there is shown a dual fuel engine system 10 according to one embodiment, and including an internal combustion engine 12 having an engine housing 14 with a plurality of cylinders 16 formed therein. Internal combustion engine 12. (hereinafter "engine 12") could include a total of one cylinder, or multiple cylinders arranged in an in-line configuration or a V-configuration, for example, or in any other suitable arrangement. Discussion herein of a single cylinder 16, or other elements, components, or characteristics, of engine 12 or associated apparatus in the singular should be understood to refer by way of analogy to any of a plurality of those elements, components, characteristics, except where otherwise indicated or apparent from the context. A piston 42 is positioned at least partially within cylinder 16 and structured to reciprocate in response to combustion of fuel and air in cylinder 16 to rotate a crankshaft 44 in a generally known manner. Engine 12 will typically operate in a conventional four-cycle pattern, although the present disclosure is not thereby limited. Dual fuel engine system 10 also includes an intake system 18 having an intake manifold 20 fluidly connected with a plurality of intake runners 22. Intake runners 22 are structured to feed air for combustion to each of cylinders 16. Engine housing 14 has an intake conduit 24 formed therein, and an intake valve 26 is movable between an open position and a closed position to fluidly connect and disconnect cylinder 16 with intake conduit 24. Engine housing 14 also includes an exhaust conduit 28 formed therein. An exhaust valve 29 is movable between an open position and a closed position to fluidly connect and disconnect cylinder 16 with exhaust conduit 28. Exhaust conduit 28 is structured to feed exhaust from engine 12 to an exhaust manifold 30.

Dual fuel engine system 10 may further include a turbocharger 32 having a turbine 34 structured to receive a flow of exhaust gases from exhaust manifold 30, and operable to rotate a compressor 36 that compresses intake air in intake system 18 for delivery to cylinder 16. A waste gate 38, which will typically be electronically controlled, is positioned fluidly between exhaust manifold 30 and turbine 34 to enable exhaust to be selectively bypassed around or past turbine 34 in a manner that varies boost pressure produced by compressor 36 according to generally known principles. Waste gate 38 can be understood as an air-fuel ratio control element operated to selectively open to limit compression and therefore density of intake air, or close to increase compression and therefore density of intake air supplied to cylinder 16. Waste gate 38 can have a range of positions between fully closed and fully open. Operating waste gate 38, or other apparatus producing functionally analogous results, enables air-fuel ratio (AFR) to be controlled. Turbocharger 32 could include a first turbocharger stage, with a second turbocharger providing a second turbocharger stage and positioned downstream of turbocharger 32. Dual fuel engine system 10 could include a plurality of waste gates associated one with each of a plurality of turbines in a plurality of turbochargers. An intake airflow control element in the nature of a compressor bypass valve (not shown) might additionally or alternatively be provided to enable intake air to bypass compressor 36 and vary pressurization of the intake air for controlling AFR in a manner generally analogous to that described in connection with waste gate 38. Engine system 10 could also include apparatus for recirculating exhaust, although one practical implementation includes no exhaust recirculation apparatus at all.

Dual fuel engine system 10 further includes a fuel system 50 having a gaseous fuel subsystem 52 with a gaseous fuel supply 54. Gaseous fuel supply 54 may include a cryogenic liquified gaseous fuel supply storing liquified natural gas (LNG) or another suitable fuel that is gaseous at standard temperature and pressure. Example gaseous fuels include not only natural gas but also methane, ethane, biogas, propane, landfill gas, mixtures of these, and still others. As further discussed herein, dual fuel engine system 10 can be structured to operate at a stoichiometrically lean equivalence ratio of fuel to air. Dual fuel engine system 10 is further structured to operate on gaseous fuels having a range of fuel quality including gaseous fuels having a methane number less than 70, potentially less than 60, or still lower, for example. Dual fuel engine system 10 may operate at liquid fuel substitution rates greater than 90%, potentially greater than 95%, and perhaps approaching 99%. Liquid fuel substitution rate means a relative proportion of total fuel energy that is provided by gaseous fuel rather than liquid fuel, in comparison to engine operation at 100% liquid fuel. The liquid fuel used in dual fuel engine system 10 may be diesel distillate fuel, however, the present disclosure is not thereby limited.

Gaseous fuel subsystem 52 may include a cryogenic pump 56, for conveying gaseous fuel in a liquified state from gaseous fuel supply 54 to a vaporizer 58. Vaporizer 58 thenceforth supplies the gaseous fuel now in a gaseous state to a pressurization pump 60. Alternative gaseous fuel supply and vaporization equipment could be used different from that depicted in FIG. 1, such as a system storing gaseous fuel in a pressurized gaseous state instead of a cryogenically stored liquid state. Pump 60 feeds gaseous fuel to an electronically controlled gaseous fuel admission valve 62 coupled with engine housing 14 and structured to admit the gaseous fuel for combustion in cylinder 16. In the embodiment of FIG. 1, a plurality of gaseous fuel admission valves 62 are shown each coupled with an intake runner 22, enabling gaseous fuel supply to be independently varied amongst the plurality of cylinders 16. In other embodiments, gaseous fuel could be admitted to intake manifold 20, injected directly into cylinder 16, or in some instances mixed with intake air upstream of compressor 36.

Fuel system 50 further includes a liquid fuel subsystem 64 for supplying the liquid fuel, and including a liquid fuel supply 66, such as a fuel tank, a fuel transfer pump 68, and a fuel pressurization pump 70. Fuel pressurization pump 70 can supply liquid fuel at a pressure suitable for injection to a common rail 72 or similar common reservoir storing a volume of pressurized liquid fuel. In other instances, unit pumps or the like could be used and each associated with one or more of the plurality of cylinders 16. Common rail 72 feeds pressurized liquid fuel to a plurality of electronically controlled liquid fuel injectors 74. Liquid fuel injectors 74 are structured to directly inject the liquid fuel into each of the plurality of cylinders 16. One electronically controlled liquid fuel injector is associated with each cylinder 16, however, in other instances each cylinder 16 could be equipped with a plurality of liquid fuel injectors including, for instance, a first liquid fuel injector for injecting relatively small pilot shots of liquid fuel into cylinder 16 during dual fuel operation, and a second liquid fuel injector structured to inject the liquid fuel into cylinder 16 during a diesel-only mode of operation, or some other operating mode. A single fuel injector with multiple sets of spray orifices for injecting liquid fuel in different spray patterns at different times, or with different steady flow rates could also be used.

Dual fuel engine system 10 also includes a sparkplug 75 mounted in engine housing 14 and including spark electrodes (not numbered) positioned within cylinder 16 and forming a spark gap 77 therein for production of an electrical spark to ignite a main charge of gaseous fuel in a gaseous fuel-only mode, or in a hybrid mode such as where an early pilot shot of liquid fuel and a spark are used cooperatively to ignite a main charge of gaseous fuel, as fiirther discussed herein. A small particle, burst, or other concentration of combusting liquid fuel could also be understood as a spark within the present context. Dual fuel engine system 10 further includes a combustion control system 76. Combustion control system 76 is structured to control characteristics of combustion in engine 12 including properties of a phasing of combustion such as combustion duration, start of combustion timing, a shape of a combustion phasing curve, to name some examples. Each electronically controlled liquid fuel injector 74 and each of a plurality of sparkplugs 75 associated one with each of the plurality of cylinders 16 can be understood as part of combustion control system 76. Combustion control system 76 further includes a phasing sensor or combustion sensor 78 structured to produce a phasing signal encoding phasing data or otherwise being indicative of a phasing of combustion in cylinder 16 in engine 12.

In one practical implementation strategy, combustion sensor 78 includes a pressure sensor exposed to a fluid pressure of cylinder 16 of a generally known type having a deformable element, a strain gauge, or still another element having an electrical state such as a voltage or a resistance that varies in response to varying of pressure within cylinder 16. Combustion sensor 78 could also include an optical sensor in certain instances. Combustion sensor 78 is mounted in engine housing 14 and could be positioned within a cylinder block or a cylinder head of engine housing 14 in a generally known manner. The phasing signal may be indicative of a phasing of combustion of a main charge of gaseous fuel ignited in response to combustion of an early pilot shot of liquid fuel and production of a spark in an engine cycle, in response to combustion of both an early pilot shot and a second pilot shot, in response to a spark only, or some other combination of combustion-initiating actions. Combustion control system 76 can further be understood to include waste gate 38, or a separate electrical actuator (not shown) for waste gate 38, as well as the various electrical actuators that are associated with gaseous fuel admission valve 62, and liquid fuel injector 74. Combustion control system 76 also includes an electronically controlled variable valve actuator 86 coupled with intake valve 26 and structured to position intake valve 26 to vary a relative position and state of intake valve 26, including a closing timing such as a late closing timing, from engine cycle to engine cycle as further discussed herein.

Combustion control system 76 also includes an electronic control unit or combustion control unit 80 coupled to combustion sensor 78 and the other electronically controlled components and sensors of dual fuel engine system 10. Combustion control unit 80 is structured to receive signals output by combustion sensor 78, or to interrogate combustion sensor 78, or otherwise receive electronic data produced by combustion sensor 78, for the control purposes further discussed herein. The phasing signal produced by combustion sensor 78 may include a fluid pressure signal or a mechanical strain signal or the like. Combustion control unit 80 also includes a data processor 82 coupled with a computer-readable memory 84. Data processor 82 can be any suitable central processing unit such as a microprocessor or a microcontroller, or a field programmable gate array, for example. Computer-readable memory 84 can likewise include any suitable computer-readable memory such as RAM, ROM, DRAM, SDRAM, FLASH, a hard drive, or still another. Computer-executable program instructions including control routines for operating dual fuel engine system 10 may be stored on memory 84, as well as the various maps and control targets referenced during execution of program instructions by way of data processor 82 according to the present disclosure, as further discussed herein.

As suggested above, combustion control unit 80 can be structured for controlling combustion, including properties of a phasing of combustion, for a main charge of gaseous fuel ignited in cylinder 16. It is believed that an initial, relatively slow and cool combustion of an early pilot shot used in some available modes of operation can produce a combustion flame producing very low emissions such as oxides of nitrogen or "NOx" and particulates or soot, and based on spray targeting and injection timing burns at locations generally radially outward close to a periphery of cylinder 16 and piston 42 while piston is traveling toward a top dead center position in a compression stroke. A spark or pilot shot of liquid fuel can be produced in some modes at a crank angle close to the top dead center position to produce another combustion flame that merges with the early pilot combustion flame to rapidly trigger conditions suitable for igniting a lean main charge of gaseous fuel. The early pilot shot can be injected after a late intake valve closing timing, such as a closing timing prior to or at about minus 60° crank angle, and at an injection timing less than 60° before a top dead center position of piston 42. The late intake valve closing timing can be varied for certain effects as further discussed herein, and assists in slowing and cooling the combustion in a manner facilitating consistent, reliable pilot ignition of the main charge of gaseous fuel with low levels of certain emissions. As will be further apparent from the following description, cycle-to-cycle adjustments to a valve timing parameter such as the intake valve closing timing, a pilot shot delivery parameter such as an early pilot shot timing, an early pilot shot quantity, a pilot shot-to-shot fuel split, and a second pilot shot timing or quantity, an in-cylinder temperature parameter such as in-cylinder temperature, AFR, or to a spark timing parameter such as a spark timing, allows a phasing of combustion of the main charge of gaseous fuel to be controlled in different operating modes in a manner that is successfid for lean mixtures at high substitution rates, with a desirable emissions profile.

Figure 2:
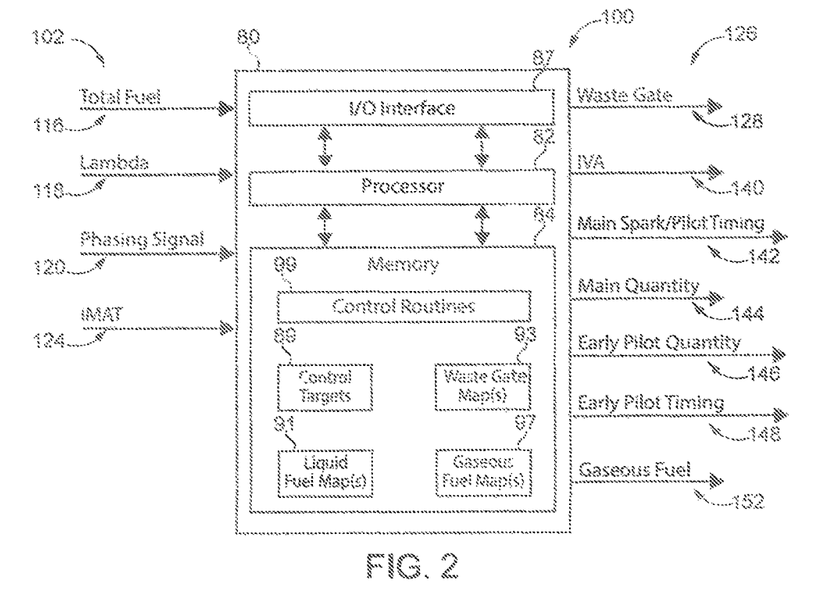
FIG. 2 is a control diagram of aspects of a combustion control system, according to one embodiment.

Referring also now to FIG. 2, there is shown a control diagram 100 according to one embodiment. Diagram 100 illustrates internal structures of combustion control unit 80, including an input/output or I/O interface 87, processor 82, and a number of data structures and software stored on computer readable memory 84. Computer readable memory 84 stores control routines 99, control targets 89, one or more liquid fuel maps 91, one or more waste gate maps 93, and one or more gaseous fuel maps 97. Control targets 89 could include a target lambda, a target engine speed, a target intake valve actuation or target IVA, a target crank angle % of total fuel charge burn location or other phasing target, or still others. A plurality of inputs 102 include a total fuel from governor input 116, a lambda input 118, phasing signal input 120, and an intake manifold air temperature (IMAT) input 124. Lambda input 118 may not represent a directly measured quantity, but instead could be representative of another measured parameter having a known relationship with lambda or serve as the basis for calculating, inferring, or estimating lambda. Based on inputs 102, combustion control unit 80 can perform calculations to produce a plurality of outputs or commands 126 including a main timing calculation to produce main timing signal 142, which can be either a spark production timing command or a pilot shot fuel injection timing command such as for a second pilot shot. Combustion control unit 80 can further perform an intake valve actuation calculation to produce an intake valve actuation (IVA) command 140, a gaseous fueling calculation to produce a gaseous fuel command 152, a waste gate calculation to produce a waste gate command 128, and liquid fueling commands to produce a main quantity command 144, an early pilot quantity command 146, and an early pilot timing command 148.

As noted above, combustion control unit 80 can be structured to receive phasing signal 120 produced by combustion sensor 78 indicative of a phasing of combustion of gaseous fuel in cylinder 16. Combustion control unit 80 is coupled to combustion sensor 78 and is structured to adjust one or more of the phasing control parameters, based on the phasing signal. Adjustment of the phasing control parameter can limit an error in a phasing of combustion of gaseous fuel in cylinder 16. Combustion control unit 80 is further structured to selectively switch cylinder 16 and other cylinders in engine system 10 from operating in a gaseous fuel spark-ignited mode to operating in a dual fuel liquid pilot-ignited mode based on the adjustment to the phasing control parameter. The phasing control parameter can include any property of engine operation that can vary combustion phasing, including properties of phasing such as a timing of a start of combustion, a timing of an end of combustion, a combustion duration, a peak pressure, a shape of a phasing of combustion curve, or still other properties. Limiting an error in a phasing of combustion can include limiting pre-ignition, limiting knock, limiting or extending combustion duration, or adjusting a timing of combustion such as a start of combustion, relative to targets for these parameters, to name a few examples. In a practical implementation strategy, the error in a phasing of combustion could include a difference between a target crank angle location for a specified percentage burned of a total fuel charge, such as a 50% burn location, and an observed crank angle burn location. Also in a practical implementation strategy, the phasing control parameter includes an AFR.

Those skilled in the art will be familiar with certain differences between properties and characteristics of operation in a gaseous fuel spark-ignited mode versus a liquid pilot-ignited mode or full diesel operation. For instance, spark-ignited combustion of gaseous fuel tends to be used at relatively richer equivalence ratios than liquid pilot-ignited operation or full diesel operation. Gaseous fuel operation, particularly with fuels that can vary in quality, tends to be associated with a greater tendency for premature ignition or knock, which effectively advances phasing. The present disclosure contemplates adjusting a phasing control parameter such as AFR to limit an error in phasing observed in a cylinder operated in a gaseous fuel spark-ignited mode. Phasing control in the gaseous fuel spark-ignited mode can also include varying spark timing, such as retarding spark timing to retard a start of combustion or extend combustion duration. Where AFR is adjusted, such as by increasing, to limit an error in phasing up to or past a lean limit for gaseous fuel spark-ignition, or where spark timing is advanced or retarded beyond a predefined range, combustion control unit 80 can trigger switching operation of any one cylinder in dual fuel engine system 10 from the gaseous fuel spark-ignited mode to operation in the dual fuel liquid pilot-ignited mode.

Combustion control unit 80 is thus further structured to switch cylinder 16 from operating in a gaseous fuel spark-ignited mode to operating in the dual fuel liquid pilot-ignited mode based on the adjustment to the phasing control parameter. The switching is performed at least in part by commanding direct injection of an early pilot shot of liquid fuel into cylinder 16, based on the adjustment to the phasing control parameter and commanding production of a spark, to ignite gaseous fuel in cylinder 16 in a first engine cycle, and commanding direct injection of an early pilot shot and a second pilot shot of liquid fuel into cylinder 16, without a spark, to ignite gaseous fuel in cylinder 16 in a second engine cycle occurring after the first engine cycle. Commanding the direct injection of the early pilot shot, based on the adjustment to the phasing control parameter, and production of a spark in the first engine cycle can initiate switching cylinder 16 to the dual fuel liquid pilot-ignited mode. Commanding direct injection of an early pilot shot and a second pilot shot of liquid fuel to ignite gaseous fuel in cylinder 16 in the second engine cycle can complete switching cylinder 16 to the dual fuel liquid pilot-ignited mode. It will thus be appreciated that when switching the mode of operation of cylinder 16 begins, both an early pilot shot and a spark may be used to ignite gaseous fuel. To complete the switching the spark is no longer used and both an early pilot shot and a second pilot shot are used.

It will thus further be appreciated that initiating the switching and completing the switching each include determining liquid pilot shot injection commands. In the case of initiating switching typically only the early pilot shot command is determined, whereas completing switching to commence operation in the dual fuel pilot-ignited mode includes determining at least two liquid pilot shot commands, for both the early pilot shot and the second pilot shot. Any of these commands could be a timing command, or a quantity command, or both a timing command and a quantity command could be determined for the early pilot shot, or for the early pilot shot and the second pilot shot. The liquid pilot shot commands may be mapped to AFR and spark timing. Accordingly, in one embodiment operation of cylinder 16 can be thought of as gradually operating cylinder 16 on a leaner and leaner fuel charge by increasing AFR, and potentially also varying spark timing, in an attempt to bring phasing to a desired state. The desirability of adjusting phasing may result from changeslerrors in phasing caused by fuel quality, ambient temperature, or other conditions. Over the course of one or more additional engine cycles AFR can be increased further, up to a point at which cylinder 16 is completely switched over to dual fuel liquid pilot-ignited operation based on the further increased. AFR. Combustion control unit 80 looks up liquid pilot shot commands for initiating switching of modes in map(s) 91 based on an AFR coordinate and a spark timing coordinate in one embodiment. Where switching modes is not triggered, combustion control unit 80 could return map values from maps 91 that result in no pilot shot injection being commanded. Depending upon the present mode, command 142 could command a timing of spark production or a timing of injection of a second pilot shot.

Combustion control system 76 can perform switching in this general manner on a cylinder-by-cylinder basis. Accordingly, the cylinder that is switched to the dual fuel liquid pilot-ignited mode can include a first cylinder, and combustion control system 76 can operate a second cylinder in dual fuel engine system 10 in the dual fuel liquid pilot-ignited mode during operating the first cylinder in the gaseous fuel spark-ignited mode. Alternatively, combustion control system 76 could continue to operate the second cylinder in the gaseous fuel spark-ignited mode, receiving a second phasing signal for the second cylinder and adjusting a phasing control parameter for the second cylinder based on the second phasing signal to limit phasing error, while switching over and operating the first cylinder in the dual fuel liquid pilot-ignited mode. Control patterns can be envisioned where dual fuel engine system 10 is operated with several cylinders in dual fuel pilot-ignited mode, several other cylinders in gaseous fuel spark-ignited mode, and the various cylinders smoothly transitioning between the modes as AFR and spark timing are adjusted to control phasing. This flexibility in operation can also take place without the need for a throttle in contrast to certain throttle-based scenarios, or if a throttle is provided switching amongst modes can occur without the need for adjusting the throttle. Operating dual fuel engine system 10 can include supplying intake air to dual fuel engine system 10 unthrottled and thus by way of the same intake flow area in each of the gaseous fuel spark-ignited mode and the dual fuel liquid pilot-ignited mode.

INDUSTRIAL APPLICABILITY

Figure 3:
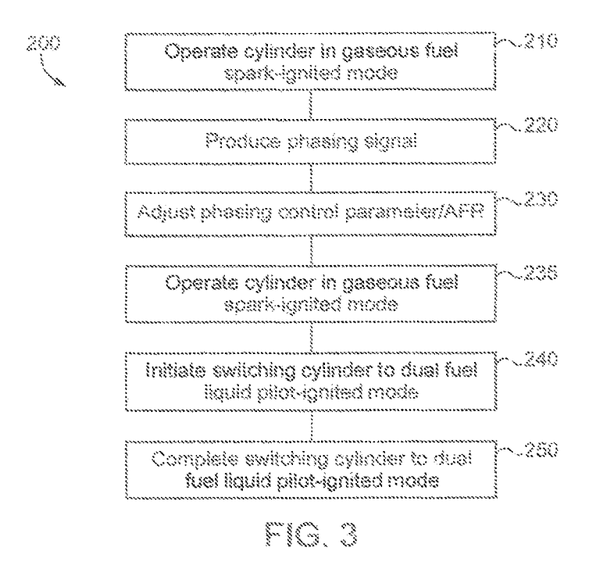
FIG. 3 is a flowchart illustrating example methodology and logic flow, according to one embodiment.

Referring to the drawings generally, but now in particular to FIG. 3, there is shown a flowchart 200 illustrating example process and control logic flow according to the present disclosure. At a block 210, cylinder 16 is operated in the gaseous fuel spark-ignited mode, in a first engine cycle. Gaseous fuel is delivered by way of gaseous fuel admission valve 62, and spark plug 75 energized to produce an electrical spark at spark gap 77. At a block 220 phasing signal 120 is produced and communicated to combustion control unit 80, which adjusts the phasing control parameter, such as AFR, at a block 230. As discussed herein, adjusting the phasing control parameter can include adjusting waste gate 38 by way of waste gate command 128 to vary pressurization of air by way of compressor 36 to obtain a desired AFR. At a block 235 cylinder 16 is operated in the gaseous fuel spark-ignited mode with an error in a phasing of combustion of gaseous fuel limited based on the adjustment to the phasing control parameter. AFR has become leaner from block 210 to block 220. For instance, increasing AFR such as by moving waste gate 38 toward a closed position, could be used to ameliorate aggressive combustion by reducing a tendency for gaseous fuel to prematurely ignite prior to production of a spark. As discussed herein, the adjustment to the phasing control parameter, including AFR or AFR and spark timing, can trigger switching cylinder 16 from the gaseous fuel spark-ignited mode to the dual fuel liquid pilot-ignited mode. Triggering switching can include combustion control unit 80 transitioning from commanding no pilot shot liquid fuel injection to commanding early pilot shot injection to initiate the switching. At a block 240, combustion control unit 80 initiates switching cylinder 16 to the dual fuel liquid pilot-ignited mode at least in part by commanding direct injection of an early pilot shot of liquid fuel, based on the adjustment to the phasing control parameter, and production of a spark to ignite gaseous fuel in the cylinder.

In some instances, continued monitoring of a phasing of combustion in cylinder 16 could include initially adjusting AFR and spark timing such that cylinder 16 starts operating on both an early pilot shot and a spark, but not yet a second pilot shot, but then upon bringing phasing error under control adjusting AFR and/or spark timing back to states suitable for continued operation in the gaseous fuel spark-ignited mode. In other instances, further increasing of the AFR and/or further adjustment to the spark timing, can result in completing switching to the dual fuel liquid pilot-ignited mode. Switching back from the dual duel pilot-ignited mode to the gaseous fuel spark-ignited mode could include substantially a reverse order of the operations discussed herein. At a block 250, combustion control unit 80 completes switching of cylinder 16 to the dual fuel liquid pilot-ignited mode at least in part by commanding direct injection of an early pilot shot and a second pilot shot of liquid fuel to ignite gaseous fuel in the cylinder, and ceasing production of a spark. The early pilot shot can be injected after a late intake valve closing timing in some embodiments, and less than 60° before a top dead center position of piston 42 in cylinder 16 as discussed herein. Intake valve closing timing can be varied to provide in-cylinder temperature control by varying an effective compression ration to vary a timing of development of conditions suitable for autoignition.

During operation in the dual fuel liquid pilot-ignited mode, a second phasing control parameter different from the first phasing control parameter can be adjusted to limit an error in a phasing of combustion in cylinder 16. In other words, whereas a first phasing control parameter, such as AFR and/or spark timing, can be varied to control phasing in the gaseous fuel spark-ignited mode, in the dual fuel liquid pilot-ignited mode a different phasing control parameter can be varied. The second phasing control parameter could include at least one of an in-cylinder temperature, adjusted such as by way of varying intake valve closing timing, or a pilot fueling delivery parameter. These several phasing control parameters could be adjusted independently of one another, covaried, or adjusted in different time domains to respond to changes in combustion phasing that are driven by fuel quality, ambient or operating conditions. For instance, intake valve closing timing could be adjusted in a slower closed-loop calculation and a fueling delivery parameter adjusted in a faster loop calculation. The pilot fueling delivery parameter could include at least one of a pilot shot timing of a second pilot shot, a second pilot shot quantity, an early pilot shot quantity, an early pilot shot timing. Embodiments are contemplated where the adjustment to the fuel delivery parameter includes an adjustment to a pilot shot-to-shot fuel split, in other words an allocation of a total liquid fuel injection quantity between or among a plurality of pilot shots. In general terms, advancing second pilot shot timing can advance a phasing of combustion, and vice versa. Increasing an early pilot shot quantity can advance a phasing of combustion, and vice versa. Still other factors might be varied in either of the gaseous fuel spark-ignited mode or the dual fuel liquid pilot-ignited mode to control a phasing of combustion. As also discussed herein, the flexibility with regard to phasing control is expected to provide advantages where different phasing characteristics are observed in different cylinders. Each cylinder in an engine can respond somewhat differently to changes in operating parameters, including fuel quality. Fuel quality can itself be relatively dynamic and thus there can be instances where aggressive combustion, or combustion instability is observed in one cylinder but not in another. The present disclosure is expected to provide and optimally exploit or nullify these or other variables that can vary from engine cycle to engine cycle and between or among individual cylinders in dual fuel engine system 10.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of controlling a dual fuel engine system comprising:
    producing a phasing signal indicative of a phasing of combustion of gaseous fuel in a cylinder in the dual fuel engine system operated in a gaseous fuel spark-ignited mode;
    adjusting a phasing control parameter, based on the phasing signal, to limit an error in a phasing of combustion of gaseous fuel in the cylinder in the gaseous fuel spark-ignited mode;
    initiating switching the cylinder to a dual fuel liquid pilot-ignited mode at least in part by commanding direct injection of an early pilot shot of liquid fuel in an engine cycle, based on the adjustment to the phasing control parameter, and production of a spark in the same engine cycle, to ignite gaseous fuel in the cylinder; and
    completing switching the cylinder to the dual fuel liquid pilot-ignited mode at least in part by commanding direct injection of an early pilot shot and a second pilot shot of liquid fuel to ignite gaseous fuel in the cylinder.

2. The method of claim 1 wherein completing switching the cylinder further includes commanding the direct injection of the early pilot shot at an injection timing occurring after a late intake valve closing timing.

3. The method of claim 1 wherein adjusting the phasing control parameter includes increasing an air-fuel ratio (AFR).

4. The method of claim 3 further comprising further increasing the AFR, and wherein completing switching of the cylinder is based on the further increased AFR.

5. The method of claim 4 further comprising supplying intake air to the dual fuel engine system by way of the same intake flow area in each of the gaseous fuel spark-ignited mode and the dual fuel pilot-ignited mode of the cylinder.

6. The method of claim 3 wherein initiating switching the cylinder and completing switching the cylinder each include determining liquid pilot shot commands mapped to AFR and spark timing.

7. The method of claim 1 wherein the error in phasing is based on a percent of fuel charge burn at a crank angle location.

8. The method of claim 1 further comprising continuing operating a second cylinder in the dual fuel engine system in the gaseous fuel spark-ignited mode while operating the first cylinder in the dual fuel liquid pilot-ignited mode.

9. A combustion control system for a dual fuel engine comprising:
    a combustion sensor structured to produce a phasing signal indicative of a phasing of combustion of gaseous fuel in a cylinder in the dual fuel engine system operated in a gaseous fuel spark-ignited mode;
    a combustion control unit coupled to the combustion sensor, the combustion control unit being structured to adjust a phasing control parameter, based on the phasing signal;
    the combustion control unit being further structured to switch the cylinder from operating in the gaseous fuel spark-ignited mode to operating in a dual fuel liquid pilot-ignited mode based on the adjustment to the phasing control parameter at least in part by:
        commanding direct injection of an early pilot shot of liquid fuel into the cylinder and production of a spark to ignite gaseous fuel in the cylinder in a first engine cycle; and
        commanding direct injection of an early pilot shot and a second pilot shot of liquid fuel into the cylinder to ignite gaseous fuel in the cylinder in a second engine cycle occurring after the first engine cycle.

10. The combustion control system of claim 9 wherein the phasing control parameter includes an air-fuel ratio (AFR).

11. The combustion control system of claim 10 wherein the combustion control unit is further structured to adjust a second phasing control parameter different from the first phasing control parameter to limit an error in a phasing of combustion in the cylinder in the dual fuel pilot-ignited mode.

12. The combustion control system of claim 11 wherein the second phasing control parameter includes at least one of an in-cylinder temperature parameter or a pilot shot delivery parameter.

13. The combustion control system of claim 12 wherein the pilot shot delivery parameter includes a pilot shot timing or a pilot shot-to-shot fuel split.

14. The combustion control system of claim 10 wherein the combustion control unit is further structured to:
    receive another phasing signal indicative of a phasing of combustion of gaseous fuel in a second cylinder in the dual fuel engine system operated in the gaseous fuel spark-ignited mode;
    adjust a phasing control parameter, based on the second phasing signal, to limit an error in a phasing of combustion of gaseous fuel in the second cylinder operated in the gaseous fuel spark-ignited mode; and
    continue operating the second cylinder in the gaseous fuel spark-ignited mode while operating the first cylinder in the dual fuel liquid pilot-ignited mode.

15. The combustion control system of claim 10 wherein the combustion control unit is further structured to look up liquid pilot shot commands for initiating switching and for completing switching the cylinder to the dual fuel liquid pilot-ignited mode based on the AFR and a spark timing.

16. The combustion control system of claim 15 wherein the AFR is increased and the spark timing is retarded from the first engine cycle to the second engine cycle.

17. A method of operating a dual fuel engine system comprising:
    operating a cylinder in the dual fuel engine system in a gaseous fuel spark-ignited mode to ignite gaseous fuel in the cylinder in response to production of a spark;
    operating the cylinder in the dual fuel engine system in a dual fuel liquid pilot-ignited mode to ignite gaseous fuel in the cylinder in response to combustion of an early pilot shot and a second pilot shot of directly injected liquid fuel without production of a spark;

limiting an error in a phasing of combustion in the cylinder in the gaseous fuel spark-ignited mode by adjusting a phasing control parameter;

triggering switching the cylinder from the gaseous fuel spark-ignited mode to the dual fuel liquid pilot-ignited mode based on the adjustment to the phasing control parameter; and igniting gaseous fuel in the cylinder in response to combustion of a directly injected early pilot shot of liquid fuel and production of a spark during the switching of the cylinder from the gaseous fuel spark-ignited mode to the dual fuel liquid pilot-ignited mode.

18. The method of claim 17 further comprising directly injecting the early pilot shot in the dual fuel liquid pilot-ignited mode after a late intake valve closing timing and less than 60° before a top dead center position of a piston in the cylinder.

19. The method of claim 17 wherein the phasing control parameter is a first phasing control parameter that includes air-fuel ratio (AFR), and further comprising limiting an error in a phasing of combustion in the cylinder in the dual fuel liquid pilot-ignited mode by adjusting a second phasing control parameter that includes at least one of an in-cylinder temperature parameter or a pilot shot delivery parameter.

20. The method of claim 17 wherein the error in phasing is caused by a change in a fuel quality of the gaseous fuel.

\* \* \* \* \*